(12) United States Patent
Lagergren

(10) Patent No.: US 7,287,425 B2
(45) Date of Patent: Oct. 30, 2007

(54) ULTRASONIC FUEL LEVEL MONITORING DEVICE

(75) Inventor: Peter John Lagergren, Glen Rose, TX (US)

(73) Assignee: Xtero Datacom Inc., North Vancouver, British Columbia (CA)

( * ) Notice: Subject to any disclaimer, the term of this patent is extended or adjusted under 35 U.S.C. 154(b) by 38 days.

(21) Appl. No.: 11/131,434

(22) Filed: May 16, 2005

(65) Prior Publication Data

US 2005/0284218 A1 Dec. 29, 2005

Related U.S. Application Data

(60) Provisional application No. 60/571,835, filed on May 17, 2004.

(51) Int. Cl.
*G01F 23/296* (2006.01)

(52) U.S. Cl. .................................. 73/290 V

(58) Field of Classification Search ............... 73/290 V
See application file for complete search history.

(56) References Cited

U.S. PATENT DOCUMENTS

| 3,985,030 | A | 10/1976 | Charlton ...................... 73/290 |
| 4,815,323 | A | 3/1989 | Ellinger et al. ................ 73/290 |
| 4,853,694 | A | 8/1989 | Tomecek ..................... 340/621 |
| 4,901,245 | A | 2/1990 | Olson et al. ................. 364/509 |
| 5,131,271 | A | 7/1992 | Haynes et al. ................ 73/290 |
| 5,150,334 | A | 9/1992 | Crosby ........................ 367/98 |
| 5,195,058 | A | 3/1993 | Simon ......................... 367/87 |
| 5,261,274 | A | 11/1993 | Nemirow ..................... 73/149 |
| 5,319,973 | A | 6/1994 | Crayton et al. ............... 73/290 |
| 5,335,545 | A | 8/1994 | Leszczynski ................. 73/602 |
| 5,511,041 | A | 4/1996 | Michalski ..................... 367/99 |
| 5,563,478 | A | 10/1996 | Suganuma .................... 318/116 |
| 5,778,726 | A | 7/1998 | Müller et al. ................. 73/290 |
| 5,866,815 | A | 2/1999 | Schwald et al. .............. 73/290 |
| 5,991,234 | A | 11/1999 | Sejalon et al. ................ 367/13 |
| 6,317,029 | B1 | 11/2001 | Fleeter .................... 340/10.32 |
| 6,396,819 | B1 | 5/2002 | Fleeter et al. ................ 370/320 |
| 6,397,656 | B1 * | 6/2002 | Yamaguchi et al. ......... 73/1.82 |
| 6,412,344 | B1 | 7/2002 | Danicich et al. ............. 73/290 |
| 6,481,627 | B1 | 11/2002 | Guerreri ................. 235/472.01 |

* cited by examiner

*Primary Examiner*—Hezron Williams
*Assistant Examiner*—Paul M. West
(74) *Attorney, Agent, or Firm*—John R. Thompson; Stoel Rives LLP

(57) ABSTRACT

The invention describes a method of altering the transmitted frequency used in an ultrasonic ranging system for liquid level measurement in a fuel tank. The frequency agility of the system is an important component of performing liquid level measurement in an enclosed vessel.

22 Claims, 10 Drawing Sheets

FREQUENCY SEARCH ALGORITHM

Phase 2: NORMAL OPERATION

In Phase 2, the system has previously determined an operating frequency F1. But, adjustment or re-intialization in accordance with Phase 1 may be required by reason of changing environmental conditions.

Each pulse is at twice the frequency desired for the full cycle, i.e. for 1 MHz the width of each pulse is 500 nanoseconds.

For a series of pulses, the mechanical reaction of piezo 16 is substantially the same as that which it would undergo if oscillated by 1 MHz at ± 25 Volts AC.

FREQUENCY SEARCH ALGORITHM

Phase 1: INITIALIZATION

In Phase 1, the algorithm determines the number of hits at each tested frequency. In an exemplary case, the range could be 900 KHz to 1.5 MHz, with each bin having a width of 5 KHz.

FREQUENCY SEARCH ALGORITHM

Phase 2: NORMAL OPERATION

In Phase 2, the system has previously determined an operating frequency F1. But, adjustment or re-intialization in accordance with Phase 1 may be required by reason of changing environmental conditions.

ULTRASONIC FUEL LEVEL MONITORING DEVICE

REFERENCES CITED

This application is based on, claims priority to, and includes the information in provisional application Ser. No. 60/571,835 filed on May 17, 2004 and which is incorporated herein by reference.

BACKGROUND OF THE INVENTION

The present invention relates to a system for ultrasonically sensing the level of fuel in a liquid fuel tank. It is considered particularly suitable for but not limited to sensing the level of propane liquid in a propane fuel tank and for sensing the quantity of heating oil in a storage tank.

In North America and throughout the world, there are substantial numbers of propane fuel tanks installed outside residential and commercial premises to provide energy for heating, cooling and cooking. These tanks can range in size from ones which have a relatively small capacity (e.g. 50 gallons) to ones which have a relatively large capacity (e.g. 1000 gallons or more). Often, the propane fuel is sold by a propane distributor to its customers under a contract where the distributor provides the customer with the tank in return for the exclusive right to supply the customer with the fuel.

Typically, propane tanks are filled by the distributor on the basis of estimated usage which is calculated using "degree lapse days" which attempts to estimate usage with climatic data, historical data, and time of years predictions. This method has certain advantages including (1) that there is no infrastructure required to produce the data other than the distributor's existing accounting infrastructure and (2) that any sufficiently large distributor will have a significant amount of historical data from which to draw. But, there are also disadvantages. There can be sufficient granularity in the data that a conservative approach to inventory management requires an average fill per tank of 45% to 50% of total volume instead of a more desirable 80% of total volume, the latter of which obviously allows the distributor to make less frequent trips to the customer with a fuel delivery truck. Further, if a distributor's estimates of a estimated usage are sufficiently in error, there can be a significant number of "out of gas" events which may lead to the loss of a customer. Moreover, without knowing the actual inventory kept in its customer's tanks, a distributor cannot use that data to optimize long term/short term purchasing contracts for propane.

Accordingly, there is a need in the propane industry for a direct method of monitoring customer inventory. In this respect, there are existing fuel tank mounted mechanical gauges which can be installed to provide an approximate indication of inventory. However, the readings they provide are typically quite unreliable (e.g. an error range of plus or minus 10% to 20%). An option that would provide improved accuracy would be to install on each tank a totalizing flow meter like that used by a fuel truck when delivering fuel to a tank, or comparable to that used by utilities that supply electricity, natural gas or water to utility customers. Then, the total volume of fuel removed from the tank then could be recorded and regularly compared with the volume when the tank was filled. However, apart from the cost of installing and maintaining such precision flow meters, the customers of a propane distributor are often located in non-urban areas. The distance between such customers can be too large to justify the repetitive manual collection of usage data.

It is known to sense the level of liquid contained in a tank utilizing sonic measurement techniques; typically sonic or ultrasonic measurements made with the use of a piezoelectric crystal. If the level of liquid is known and the geometry of the tank is known, then the volume of liquid in the tank can be calculated based upon the measured level. However, when the liquid in question is propane and the tank in question is a propane tank, problems arise. One problem is the adequacy of acoustic coupling between the ultrasonic transducer and the fuel tank. If the coupling is poor, then it may not be possible to obtain a measurement, or any measurement made may be unreliable. Another problem is the voltage levels which are generated by the transducer. If relatively high voltages are involved, then regulatory approval may be difficult or impossible to obtain. Dominating any solution to such problems is the question of cost. A solution which enables direct measurement but which requires a costly installation on each fuel tank of each customer is an impractical solution.

BRIEF SUMMARY OF THE INVENTION

In accordance with the present invention, there is provided a new and improved ultrasonic fuel level monitoring system for sensing the level of liquid in a liquid fuel tank. The system includes an ultrasonic transducer unit externally mountable on the bottom of the tank and a control unit operably connectable to the transducer unit. In a preferred embodiment where the tank is a propane tank, the control unit is preferably mounted atop the tank and is connected to the transducer unit by an electrical cable.

The transducer unit includes a piezoelectric crystal ("piezo") transducer, a piezo driver circuit, and preferably a temperature sensor. In cases where the propane tank is a steel wall propane tank, it has been found that the transducer unit advantageously further includes an aluminum disk normally interposed between the piezo and the tank wall to provide improved acoustic coupling.

In response to command signals from the control unit, the piezo driver circuit causes the piezo to transmit ultrasonic pulse trains having a controlled pulse frequency through the wall of the tank (and the aluminum disk if included), and to listen for return echoes from the surface of liquid in the tank. Echo return signal information is sent back to the control unit from the transducer unit.

The controlled pulse frequency determined by the control unit is an adaptively determined pulse frequency. More particularly, it has been found that the pulse frequency at which suitably strong echo return signals can be detected may not only differ from the resonant frequency of the piezo but also can depend upon the acoustical impedance of the "stack" (viz. the piezo, aluminum disk (if any), and tank wall thicknesses combined), the acoustical impedance of the bonding agent used to secure the transducer unit to the tank, and ambient temperature. It is possible that other factors may have an influential effect. All of these considerations and possible unknowns recommend against a fixed pulse frequency and in favor of a system where the pulse frequency is frequency agile, and is adaptively determined depending upon echo return signal strengths that can be obtained over a swept range of pulse frequencies.

The process of transmitting ultrasonic pulse trains into a fuel tank and listening for return echoes is referred to herein as "pinging" the tank. As is well understood by those skilled in the art, the time that it takes for a transmitted signal to the reach the liquid surface and to be echoed back (viz. time-of-flight) will correspond to the liquid level. With knowledge of the tank geometry, a measurement of the volume of fuel in the tank then can be calculated.

The temperature sensor mentioned above is desirable because, as is also well understood by those skilled in the art, tank geometry will vary with increasing or decreasing temperatures. Thus, the time-of-flight measured at one temperature may be the same as the time-of-flight measured at another temperature. Yet, the actual volume of fuel in the tank at the two temperatures may differ. With knowledge of the temperature and tank geometry as a function of temperature, a more accurate measurement of the volume of fuel in the tank can be calculated at any given temperature. When the transducer unit includes a temperature sensor, a signal corresponding to temperature is sent back to the control unit from the transducer unit.

DETAILED DESCRIPTION OF THE INVENTION

Figure 1:
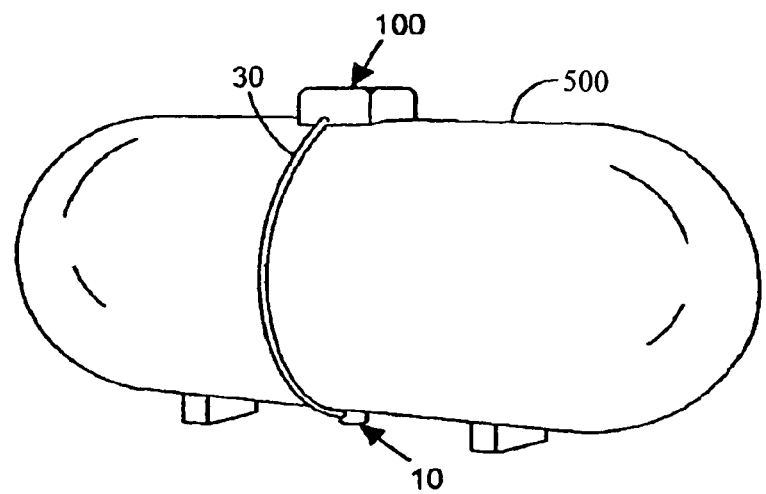
FIG. 1 is a perspective view illustrating mechanical aspects of an ultrasonic fuel level monitoring system in accordance with the present invention when mounted to a propane fuel tank.

Referring to FIG. 1, there is shown an ultrasonic fuel level monitoring system for sensing the level of liquid in a propane fuel tank 500. The system includes an ultrasonic transducer unit generally designated 10 externally mounted on the bottom of the tank and a control unit generally designated 100 externally mounted on the top of the tank. Control unit 100 is operably connected to transducer unit 10 by electrical cable 30. As described below in more detail, the transducer unit transmits ultrasonic signals through the wall of tank 500 and listens for return echoes from the surface of propane liquid (not depicted) contained in the tank. The control unit directs the operation of the transducer unit and collects time-of-flight data and temperature data from the transducer unit.

Figure 2:
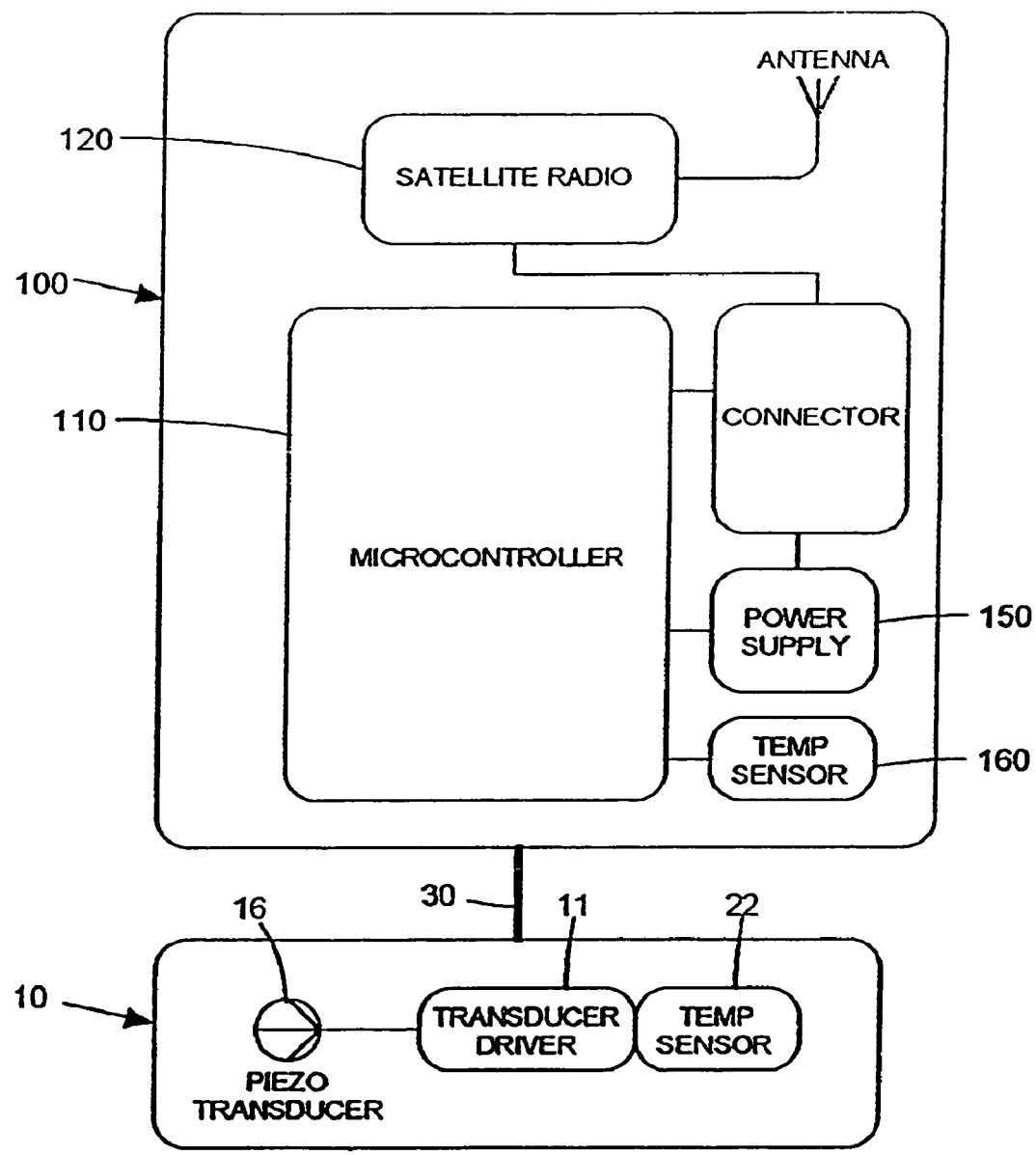
FIG. 2 is a high level block diagram of the monitoring system shown in FIG. 1.

As shown in FIG. 2, transducer unit 10 comprises a transducer driver 11, a piezoelectric crystal transducer or piezo 16, and a temperature sensor 22. Temperature sensor 22 is used to obtain a measurement of the temperature of tank 500 which is desirable in order to adjust readings taken for accuracy (e.g. within plus or minus 2%). Control unit 100 comprises a very low power microcontroller 110 connected to a satellite radio 120, a battery power supply 150 and an ambient temperature sensor 160. To minimize size and cost, radio 120 is preferably a simplex radio capable of transmitting but not receiving.

Figure 4:
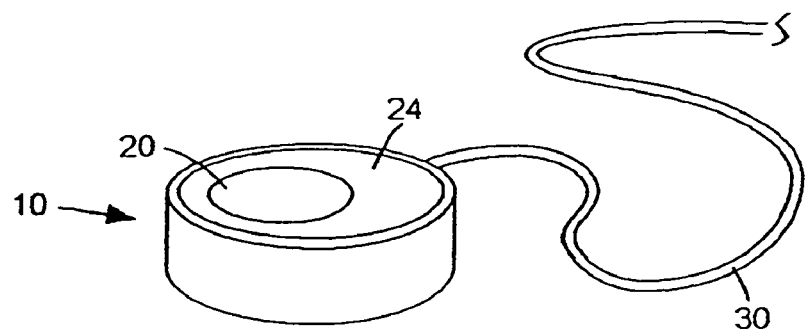
FIG. 4 is a perspective view illustrating mechanical aspects of the transducer unit forming part of the monitoring system shown in FIG. 1.
Figure 5:
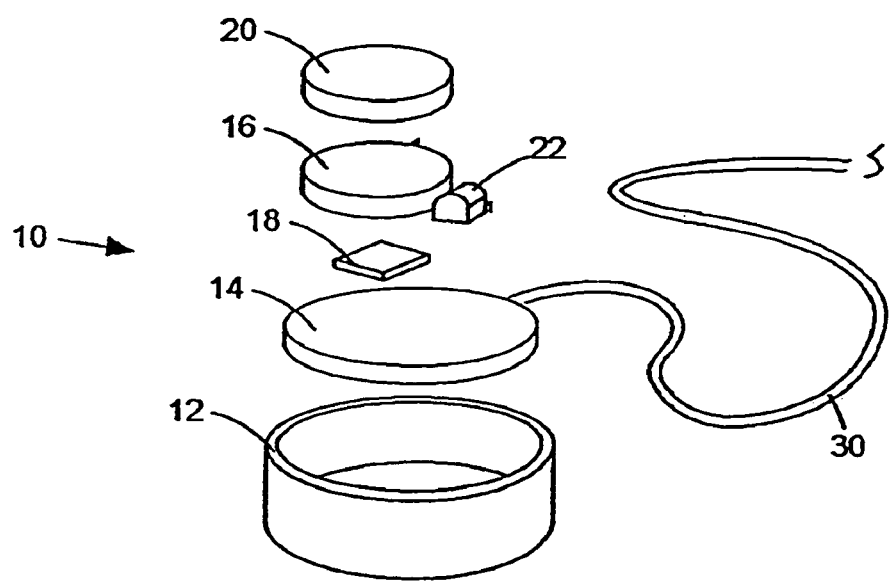
FIG. 5 is an exploded perspective of the transducer shown in FIG. 4.

As shown in FIGS. 4-5, transducer unit 10 additionally comprises a housing 12, a printed circuit board (PCB) 14 for holding transducer circuitry which is normally mounted to the bottom of the board, a foam pad cushion set on PCB 14 and 18 atop which piezo 16 normally rests while connected to the board, and an aluminum acoustic coupling disk 20. Temperature sensor 22 is mounted atop PCB 14. Disk 20 is bonded (viz. with epoxy) directly atop piezo 16. All components are secured within housing 12 by potting compound 24 with the upper surface of disk 20 left exposed for contact with the bottom outer wall of tank 500 when unit 10 is bonded to the tank.

Figure 3:
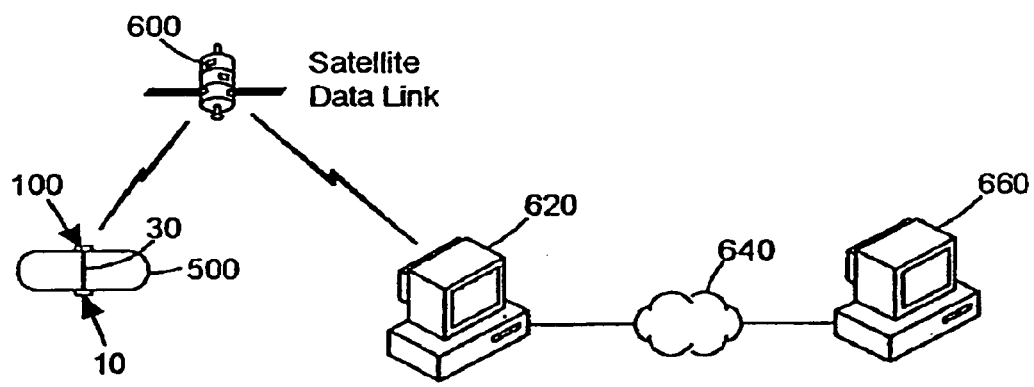
FIG. 3 shows a working environment for the propane tank and the monitoring system shown in FIG. 1.

FIG. 3 illustrates a working environment wherein data collected by control unit 100 from transducer unit 10, including time-of-flight data and temperature data, is transmitted by radio from control unit 100 via a satellite data link 600 to a computer 620. Computer 620 includes a computer readable storage medium which receives the data input and, together with previously stored information on tank geometry and dimensions and a suitable computer program product, processes the received data to calculate a measure of the volume of fuel in tank 500. The calculated measure is also stored in the storage medium and may be read-out and displayed by computer 620. Via a further data link (e.g. the internet 640), the calculated measure may also be read-out and displayed from computer 620 by a second computer 660.

It will be appreciated that the foregoing working environment is one which can be expanded to a system where a centralized server computer (e.g. computer 620) receives data transmissions via satellite from numerous control units 100 each monitoring a different propane tank (e.g. tank 500). The propane tanks may be located at widely dispersed geographic locations. Some may be serviced by the same propane distributor and others may be serviced by different propane distributors. Each distributor could utilize its own computer 660 to receive data from computer 620 concerning the customers it services.

In more detail, transducer unit 10 is silent and unpowered during all phases of operation except when a tank reading is being requested. Control unit 100 is timed to wake up at intervals (e.g. every 16 seconds) to determine the time of day, and to compare that time with a sensing and transmission schedule programmed in microcontroller 110. If the system is not scheduled to either "ping" tank 500 or to transmit measurement information via satellite radio 120, then unit 100 goes back to sleep.

If the system determines that a sensed reading is required, then transducer unit 10 is powered on by the control unit activating a 3.3 volt power supply that feeds power to the transducer unit. The transducer unit then uses a very small, very low current drain, circuitry to generate 25 volts for use in the drive circuit for piezo 16 (viz. analog switching circuit 48).

When transducer unit 10 wakes up, it is programmed to listen for a set of commands sent to it by control unit 100 over a synchronous serial data link including cable 30. Control unit 100 will tell transducer unit 10 a lower frequency of piezo oscillation, an upper frequency of piezo oscillation, the number of pings to perform and the frequency difference between each sequence of pings.

A ping is generated by microcontroller 40 flipping two signals from 0 to 3.3 volts and back to 0 volts at a frequency rate that is determined by command from control unit 100. A pulse train of 36 pulses set for each ping has been found to be suitable, but it of course will be understood that a differing number of pulses also may be found suitable.

As each pulse packet is sent, piezo 16 is shorted to ground by control from microcontroller 40 to dampen any residual ringing of the piezo and to quiet the receiver circuit provided by analog switching unit 48. After an appropriate quiet period (viz. of greater than 100 microeconds), the receiver circuit is enabled by microcontroller 40. Any signal received from piezo 16 is then amplified by amplifier 60 and filtered by noise filter 65. If the received signal is greater than a preset value as determined by comparator 70, then microcontroller 40 captures the event and calculates the time-of-flight from the start of the ping to the arrival of the echo. If no echo is present, the microcontroller uses an arbitrary maximum value for the time of flight.

After each ping is generated and an echo timed, microcontroller 40 takes a temperature reading from temperature sensor 22. When an echo/temperature cycle is complete, microcontroller 40 begins a data transfer phase.

Figure 6A:
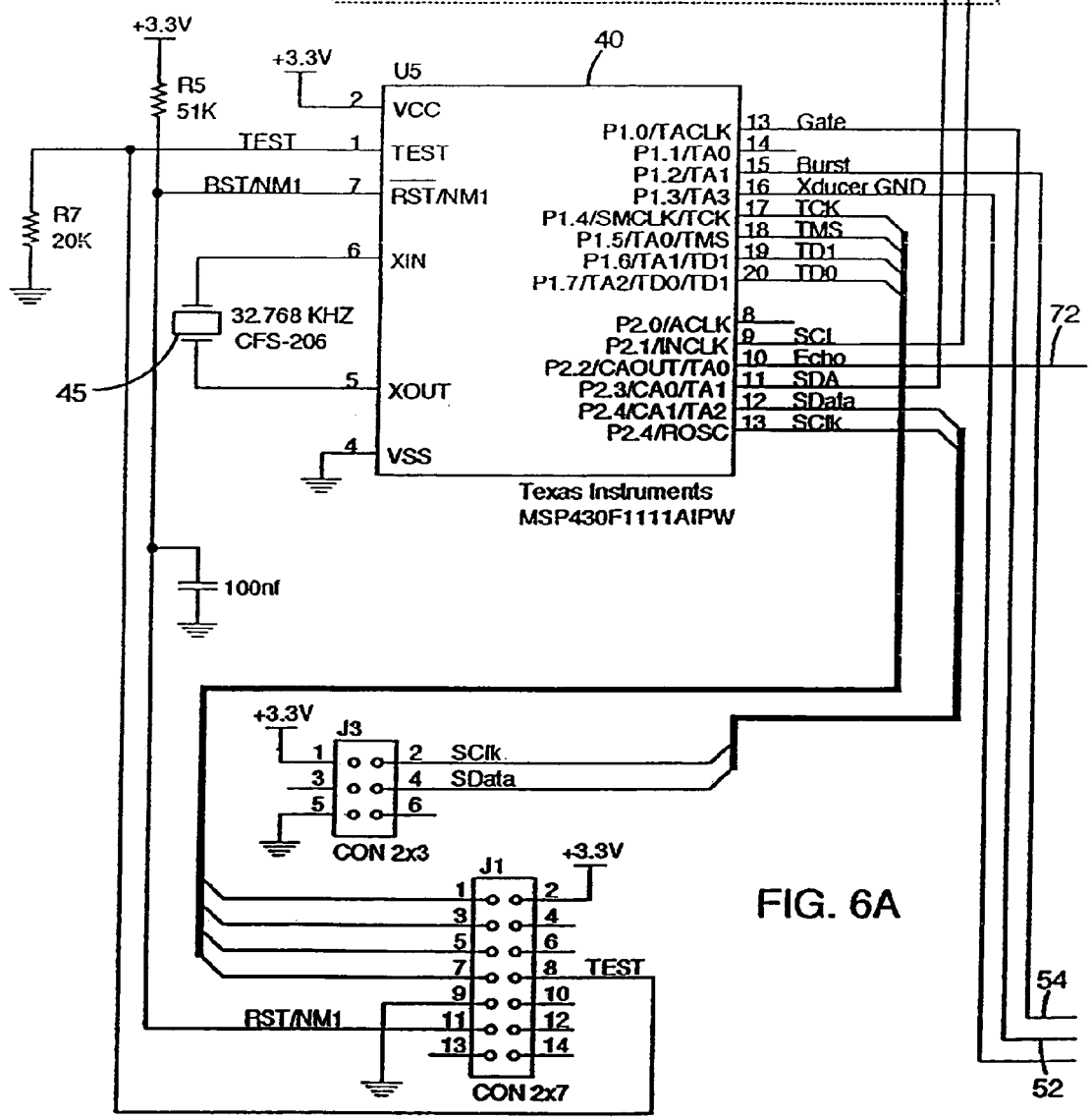
FIG. 6 consisting of FIGS. 6A to 6C assembled in the manner shown in FIG. 6D is a diagram of circuitry the within transducer unit shown in FIG. 2.
Figure 6B:
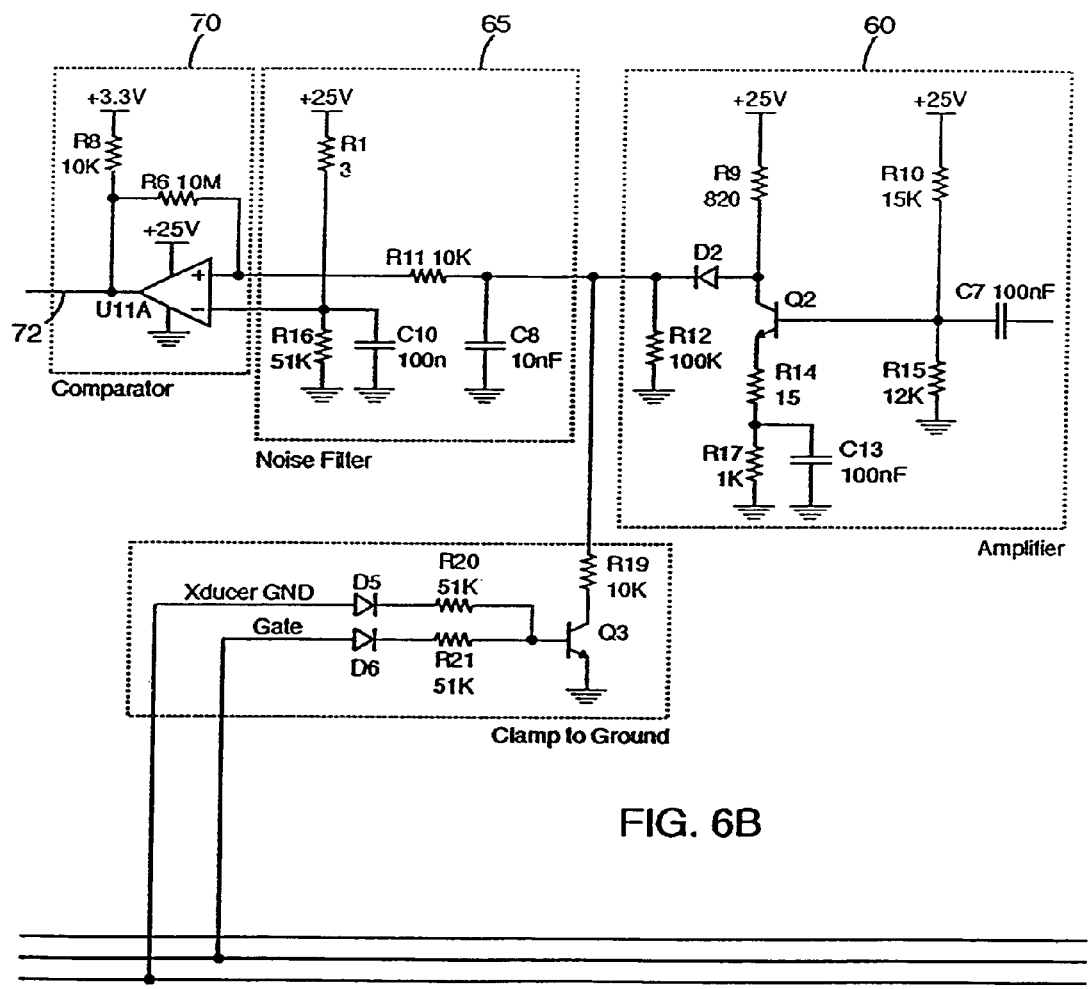
Figure 6C:
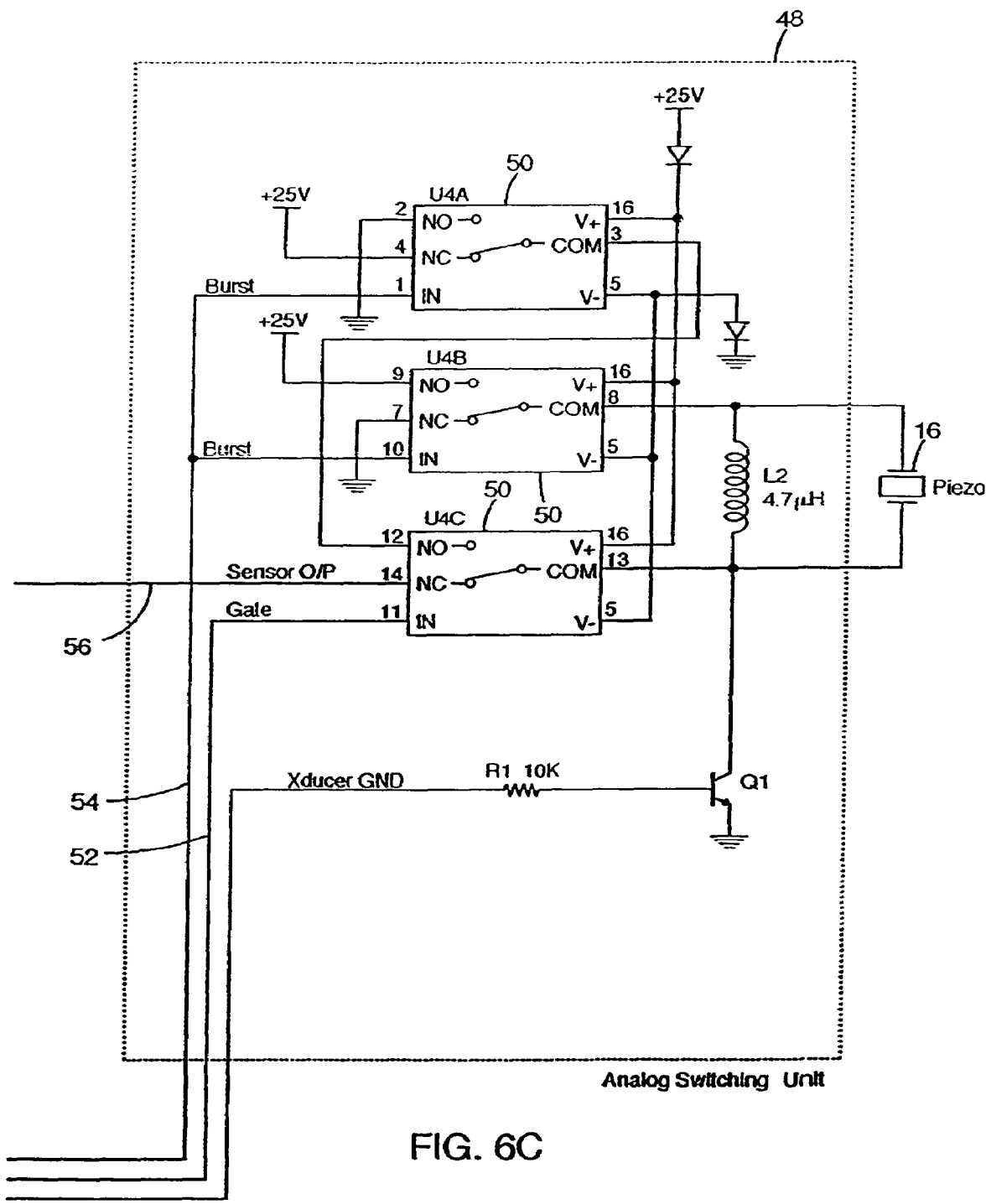
Figure 7:
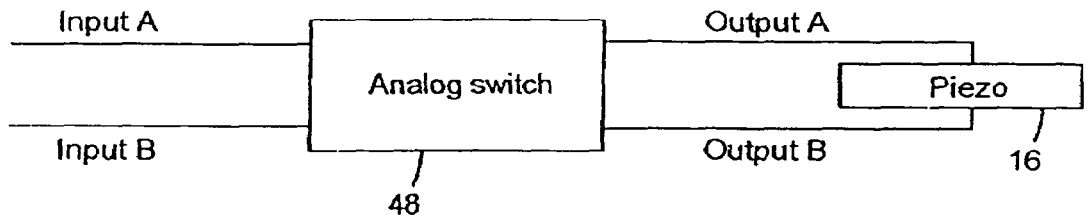
FIG. 7 is a set of waveforms illustrating the pulsing of a piezoelectric crystal in accordance with the present invention.
Figure 7:
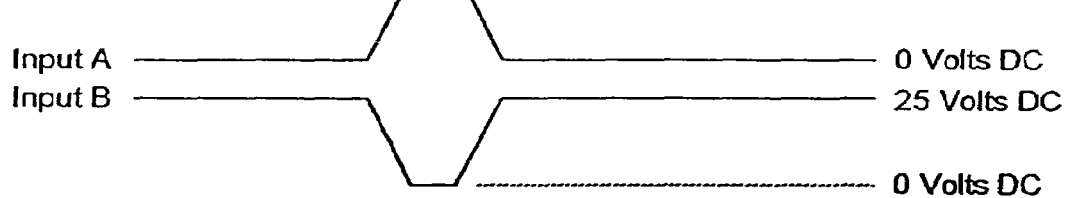
Figure 7:
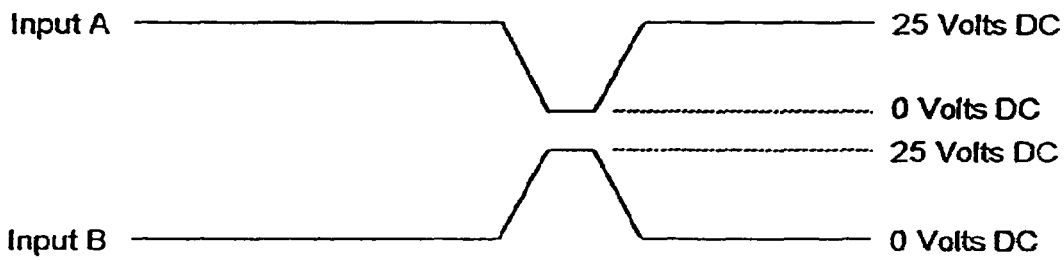
Figure 7:
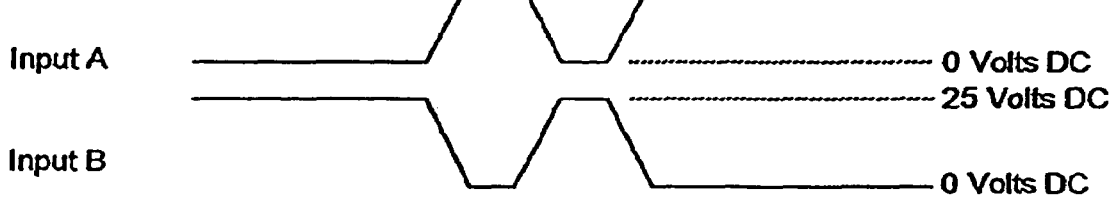

In an exemplary case, the start of each communication is a 256 count long square wave. This is used to determine the exact frequency of transmitted ultrasonic packets. Since the system is frequency agile (see below), it is necessary to know the exact frequency of the piezo pulse. This timing is determined by measuring the first transducer pulse during the communication phase. Transducer unit 10 utilizes a very low power crystal drive circuit based on a nominal 32 KHz watch crystal 45 (see FIG. 6A), which is used to synthesize an 1 MHz internal operating frequency of microprocessor 40. By using this architecture, there is no need for transducer unit 10 to have a large and expensive microcontroller drive crystal oscillator. Consequently, costs are advantageously kept down and the size of transducer circuit PCB 14 is reduced.

In an exemplary case, microcontroller 110 in control unit 100 may be a Texas Instruments MSP430F147IPM microcontroller which includes the time-of-day clock (built in) mentioned above and analog to digital converters. The analog-to-digital converters are assigned to several optional analog sensor inputs and the input line from power supply 150. As well, the TI microcontroller includes four active serial ports, one of which is used to provide the synchronous link to transducer unit 10. A second is a USART configured to communicate with satellite radio 120. A third is a USART configured to communicate with a Personal Digital Assistant ("PDA" not shown) that may be used to facilitate installation of the monitoring system. The fourth can be used to provide a synchronous link to an ambient temperature sensor on the PCB (not shown) of control unit 100.

Control unit 100 operates in two modes; installation and normal operation. During installation, unit 100 is configured to constantly send ping messages to transducer unit 10 to allow an installer to find the correct installation spot on the bottom of tank 500. It can report the time-of-flight and transducer operating frequency to an external PDA used by the installer. When the installer sees a pattern of successful pings at a test location, then transducer unit 10 is permanently affixed to the tank bottom at that exact location.

After completion of the installation process, the installer may use a PDA to send a commissioning message to control unit 100 (more specifically microcontroller 110), which provides a schedule for wake up and ping, a schedule for transmitting normal data and the parameters for transmitting alarm level data of the satellite link (FIG. 3) at an unscheduled time. The PDA also may be used to transfer site-specific data to microcontroller 110 for use in the commissioning process.

As indicated above, microcontroller 110 may be programmed to wake up every 16 seconds and to decide whether a ping event is required. For residential propane tanks, this may be once per day. For commercial tanks, this may be once per hour.

To start a ping sequence, microcontroller 110 refers to the last known good ping record to determine which starting and ending ultrasound frequencies to send. Because the acoustical environment can change over time and temperature for a given tank 500, the use of a low power transducer unit 10 requires that the acoustical frequency of piezo 16 be altered to the resonant frequency of the tank under current conditions. Microcontroller 110 performs this task be setting an initial ping pattern of starting frequency, ending frequency, frequency granularity and number of search pings. This data is transmitted to microcontroller 40, which then executes the search pattern.

Figure 8:
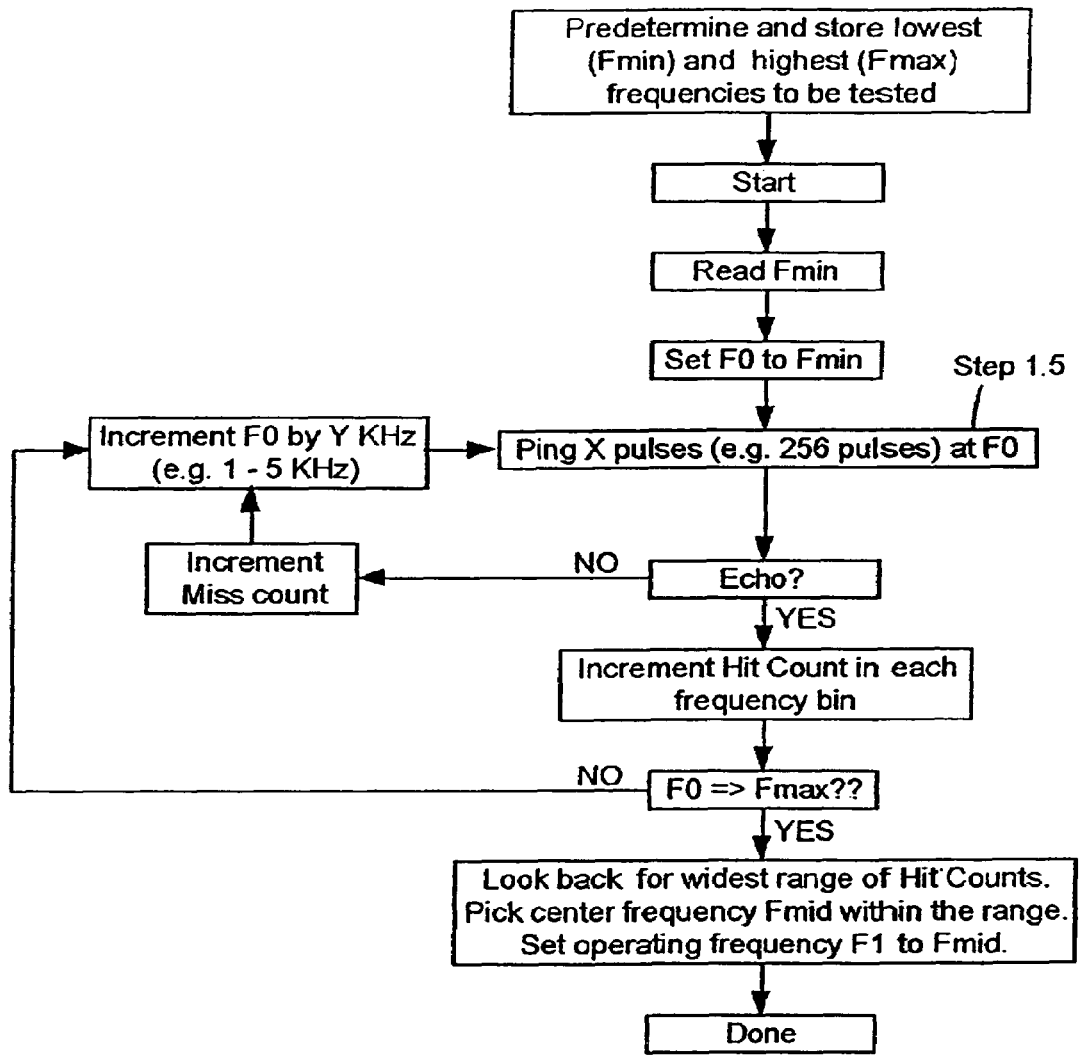
FIG. 8 is a flowchart illustrating steps for initially searching for and determining a suitable operating frequency for pulsing the piezo shown in FIGS. 2, 5 and 6.
Figure 9:
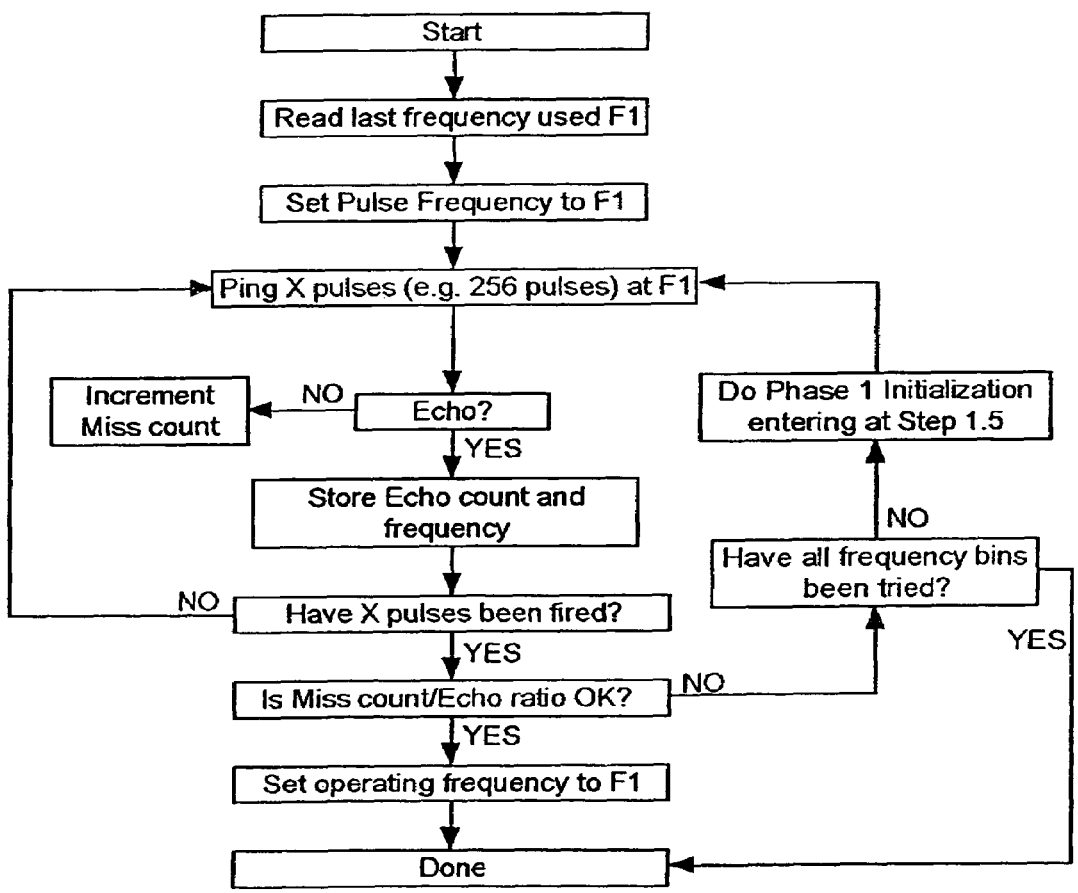
FIG. 9 is a flowchart illustrating steps for subsequently searching for and determining a suitable operating frequency for pulsing the piezo shown in FIGS. 2, 5 and 6.
Figure 10:
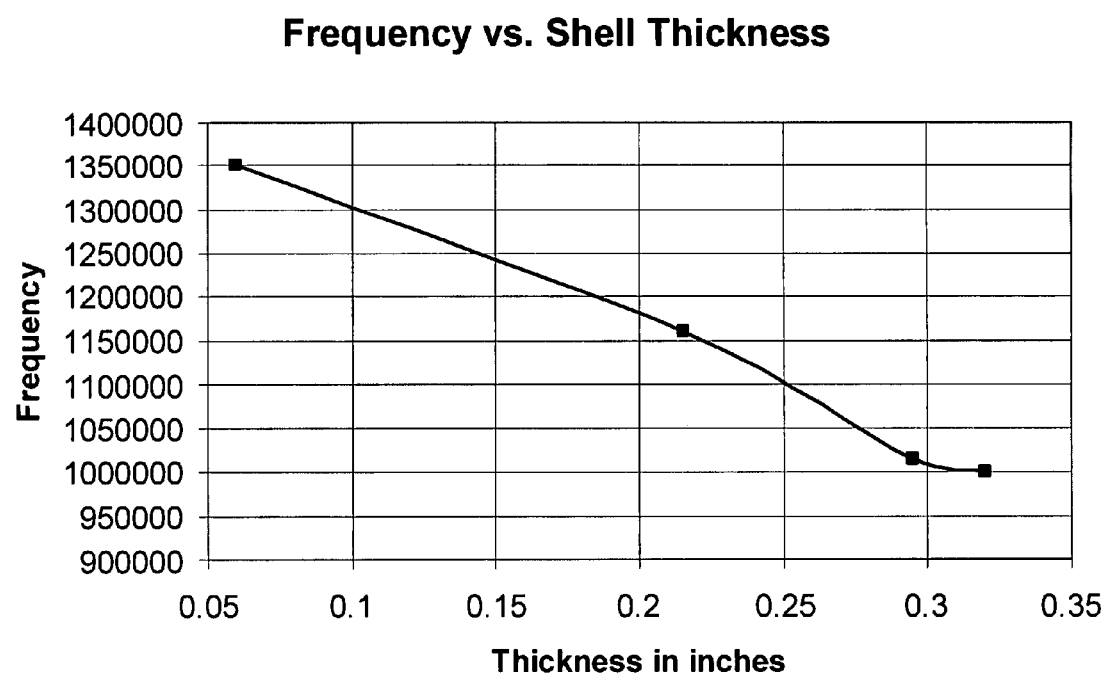
FIG. 10. is a plot of operating frequency vs. tank thickness.

The operating frequency for pulsing piezo 16 is determined by microcontroller 110 which is programmed to execute the steps shown in FIGS. 8-9. If an operating frequency F1 (Fmid) has not yet been determined, then the steps shown in FIG. 8 are executed. If an operating frequency F1 has previously been determined, then the steps shown in FIG. 9 are executed.

When a search pattern is complete, then microcontroller 110 analyzes the data from the transducer to determine the goodness of the data and to establish an operating frequency. If the data is not sufficiently good in the number of hits, or if a center frequency in the data has not been found, then in normal operation microcontroller 110 reshapes the search to find a suitable frequency.

After completion of a search pattern, microcontroller 110 sends a command to microcontroller 40 to ping (e.g. 32 times) at the center or operating frequency. During each ping event, the system uses its crystal-generated clock to accurately time the frequency of ultrasonic pulses sent by the transducer. This is an important measurement because the use of a frequency agile clock in the transducer microprocessor means that time-of-flight data reported by the transducer is relative time and not absolute time.

When a prescribed number of ping results have been received (e.g. 32 pings), the system will average the effective echoes and compare those with programmed alarm levels. During the data conversion process, the arbitrary time-of-flight reported by the transducer is converted to microseconds for the actual time-of-flight. As well, the system will measure the temperature of the circuit board for microcontroller 110 and will use its A/D converters to determine battery voltage.

After completion of the acoustical cycle and the alarm comparison, microcontroller 110 determines whether or not to transmit the data. If a data transmission is required, then microcontroller 110 will activate the power supply for radio 120 and load a data packet (e.g. a 9 byte packet) into a serial port of the radio. In normal operation, radio 120 will receive and send to computer 620 a packet with data on time-of-flight, propane tank temperature as sensed by temperature sensor 22, battery voltage, and battery temperature as sensed by temperature sensor 160.

Frequency agility as described above is important to better ensure that the system is able to adapt to changing environmental conditions. The effectiveness of coupling between piezo 16 10 and tank 500 is also an important factor. Where the coupling is good, performance can be exceptional if the frequency is correct for the installation.

If the transducer is off-frequency, there are no echoes at all. It has been found that coupling can be significantly enhanced with the use of an aluminum coupling disk such as disk 20.

The above graph is a plot of operating frequency v. tank shall thickness in experiments that were done with the 0.125" aluminum disk/piezo combination where the resonant frequency of the piezo was 1 MHz.

In field tests, results have been seen at the following frequencies:

| Actual Thickness (Inches) | Frequency (HZ) | Stack Thickness (Inches) | Lambdas |
|---|---|---|---|
| 0.218 | 1160000 | 0.343 | 1.980685 |
| 0.293 | 1020000 | 0.418 | 2.122461 |
| 0.321 | 1000000 | 0.446 | 2.220231 |

This shows an apparent correlation between the thickness of the piezo/aluminum/tank stack and the frequency found to work in the field. Since the number of wavelengths lambda (k) is close to an integral multiple of X/4 this means that the resonant frequency is probably determined by the entire stack thickness, with the exception of the 0.293" tank where results were not reproducible. In that case, it is believed that the performance of the transducer was related to the KY film thickness is that the n(X/4) relationship was too far removed from a transmissive frequency range. It also explains the difficulty in getting echoes from the 0.218" tank in that while the stack was at a node of the wave, which is less efficient at transferring energy to the propane than being on a quarter-wave or three-quarter wave boundary.

The transmission of sound from one medium to another through a thick intervening layer is described by an equation that relates the thickness of the intervening layer to the wavelength of incident sound. L is the thickness, n is any integer an X is the wavelength.

$$L=(2n-1)X/4$$

If this is solved for a range of n=0 to 5, the equation reduces to 1 X/4, or the special case of a quarter wavelength disappearing from the calculation, 3 X/4, 5 X/4, 7 x/4 and 9 x/4.

Consequently, the thickness of the tank shell and the aluminum disk should be sized so that at the operating frequency range of the piezo, the wave number at the interior wall of the tank must be close to X, n+0.25 X or n+0.75 X to transfer the maximum amount of energy to the propane mass.

The resonant frequency of any particular piezo/tank combination is dependent on the acoustical impedance of the stack, the ambient temperature and the acoustical impedance of the bonding agent that glues the transducer to the bottom of the tank. Consequently, the frequency required at any given time is not a fixed value.

There are two potential strategies for converging on the best possible solution. In the first case, if a ¼ aluminum disk is used, the disk disappears from the calculation of acoustical impedance of the stack and only the tank wall is factored:

| Tank Thickness (Inches) | Al Pad Thickness | Stack Thickness | Frequency (HZ) | Lambdas |
|---|---|---|---|---|
| 0.218 | 0.05 | 0.268 | 936000 | 1.248746 |
| 0.293 | 0.05 | 0.343 | 1024000 | 1.748467 |
| 0.321 | 0.05 | 0.371 | 948000 | 1.750836 |

This appears acceptable, except for the probable mechanical fragility of a 0.05" 5 aluminum disk.

As a special case, it was found during a laboratory trial with a 10 pound propane tank that the required frequency for a signal was 35% higher than the resonant frequency of the piezo:

| Actual Thickness (Inches) | Frequency (HZ) | Stack Thickness (Inches) | Lambdas |
|---|---|---|---|
| 0.0625 | 1350000 | 0.1875 | 1.260081 |

The resonance was found on the n+0.25 wave number boundary.

Changing the aluminum to a complete wavelength and adjusting the frequency to give a 10 n+0.25 or n+0.75 resonant frequency gives the following:

| Tank Thickness (Inches) | Al Pad Thickness | Stack Thickness | Frequency (HZ) | Lambdas |
|---|---|---|---|---|
| 0.218 | 0.2 | 0.418 | 1318000 | 2.742553 |
| 6.293 | 0.2 | 0.493 | 1324000 | 3.249363 |
| 0.321 | 0.2 | 0.521 | 1254000 | 3.25236 |

These frequency values are probably out of the usable frequency range of the piezo, so a different strategy is called for.

It is presently considered that the maximum energy transfer into propane and the highest receive sensitivity must occur at frequencies that are closer to the resonant frequency of the 15 piezo, i.e. 1 MHz. Consequently, it is considered that the strategy should be to optimize the stack thickness for quarter and three quarter wave frequencies that are as close to 1 MHz as possible.

One strategy would be to use an aluminum pad thickness that is intermediate between X/4 and X. In the range of expected thickness that is found in propane tanks in the field, the combination of the piezo/aluminum/tank stack thickness and frequency can be sized to correspond to n(X/4) where wavelength(s) at the interior wall of the tank are n+0.25 or n+0.75.

The calculated results of one size for this strategy are as follows:

| Tank Thickness (Inches) | Al Pad Thickness | Stack Thickness | Frequency (HZ) | Lambdas |
|---|---|---|---|---|
| 0.218 | 0.185 | 0.403 | 1120000 | 2.246914 |
| 0.293 | 0.185 | 0.478 | 1156000 | 2.750737 |
| 0.321 | 0.185 | 0.506 | 1090000 | 2.745619 |

Obviously, this strategy gives a set of frequencies that are well within the proven resonant range of the piezo.

Another strategy would be a thicker aluminum disk with 1.25 lambda internally so that the transfer to the steel tank wall is maximized. The calculations are:

| Tank Thickness (Inches) | Al Pad Thickness | Stack Thickness | Frequency (HZ) | Lambdas |
|---|---|---|---|---|
| 0.218 | 0.25 | 0.468 | 966000 | 2.250538 |
| 0.293 | 0.25 | 0.543 | 1018000 | 2.751762 |
| 0.321 | 0.25 | 0.571 | 972000 | 2.762903 |

This appears to be a better solution, in that the resonant values are more closely clustered around 1 MHz.

It is presently considered that the strategy of sizing a stack to correspond to n+0.25 X or n+0.75 X will have the same transmissivity as X/4 or nearly 100% passage of energy into the tank, less losses in the impedance mismatches of the materials and losses in the glue or bonding lines. The nX case may be nearly as good at transferring energy so that gives us three cases where resonance can be seen.

As indicated above, the implementation of a frequency agility algorithm is in stages. The software to manage the process is contained in a microcontroller such as microcontroller 110.

In the first stage, the transducer unit 10 is installed temporarily to the bottom of tank 500 using a water based acoustical coupling gel. The installer selects the frequency search mode on the installation computer. Control unit 100 will then send a message to microprocessor 40 in transducer unit 10 to begin a set of pings that begin at a starting frequency Fmin, an ending frequency Fmax, the frequency jumps between pings, and the number of pings at each frequency. The transducer unit reports the data from each individual ping, preceding the data packet with a square wave exactly equal to 256 clock cycles at whichever frequency the transducer is using for that ping. The control unit converts this time back to a true frequency. The existence or nonexistence of an echo is logged into an internal database in the control unit referenced to the measured frequency. The control unit then selects the correct operating frequency Fmid as the median value of the upper and lower ranges of where echoes have been found.

Once the installer has found the point on the bottom of the tank that is orthogonal to the surface of the liquid propane, he emplaces transducer unit 10 permanently to the tank using an adhesive. He then selects the operating mode of the unit, i.e. hourly, daily, monthly, etc. This places the system into the second mode of frequency agility.

In the second mode, the system is awakened by a real time clock in control unit 10 and prepares transducer unit 10 for a measurement cycle. Control unit 110 will send a message to the transducer unit to ping some number of selected times at the frequency established in the installation process. If an adequate number of echoes is found to establish a reliable propane level, the control unit will de-power the transducer and process the data for either an alarm condition or a scheduled transmission. If adequate echoes are not found, then control unit 10 will use a truncated frequency search centered about the primary frequency found in the installation process. This truncated frequency search may have a much lower granularity than the frequency search used in the installation process, typically 1 KHz or less, versus 10 KHz during the installation process. Once the control unit has found the new resonant frequency, that value is stored for use at the next wake up and measure cycle.

If the fine granularity frequency search cycle doesn't find usable echoes, the control will default to the installation search cycle and begin the entire process again.

The invention claimed is:

1. A method of determining the level of liquid mass in a storage tank by use of an externally mounted ultrasonic transducer, comprising:
   transmitting pulses of acoustical energy at an operating frequency into the liquid mass;
   timing the arrival of return echoes of the transmitted pulses; and
   altering the operating frequency of the transmitted pulses by,
      transmitting pulses a plurality of times at the operating frequency into the liquid mass,
      determining whether each transmitted pulse results in a miss count or in an echo,
      determining a miss count versus echo ratio,
      determining if the ratio is acceptable, and
      resetting the operating frequency.

2. The method of claim 1, wherein resetting the operating frequency comprises:
   establishing a range of frequencies to be tested,
   testing a plurality of frequencies from the range to determine if each frequency generates an echo,
   determining the widest subrange of frequencies that each generated an echo, and
   setting the operating frequency as substantially the center frequency from the widest subrange.

3. The method of claim 2, wherein testing the plurality of frequencies includes,
   selecting a minimum frequency from the range;
   testing the minimum frequency;
   incrementing the minimum frequency to select a new frequency;
   determining if the new frequency exceeds a maximum frequency; and
   testing the new frequency.

4. The method of claim 1, further comprising:
   determining if an event requiring measurement of the level of the liquid mass is required.

5. The method of claim 1, further comprising:
   determining the frequency of the last transmitted pulse; and
   setting the operating frequency to the frequency of the last transmitted pulse.

6. A method of determining the level of liquid in a storage tank by use of an externally mounted ultrasonic transducer comprising:
   determining an operating frequency for the ultrasonic transducer by,
      establishing a range of frequencies to be tested,
      testing a plurality of frequencies from the range to determine if each frequency generates an echo,
      determining the widest subrange of frequencies that each generated an echo, and
      setting the operating frequency as a frequency within the widest subrange of frequencies;
   transmitting pulses of acoustical energy into the liquid mass at the operating frequency; and
   timing the arrival of echoes of the transmitted pulses.

7. The method of claim 6, wherein setting the operating frequency as a frequency within the widest subrange of frequencies includes setting the operating frequency as substantially the center frequency of the widest subrange.

8. The method of claim 6, wherein testing the plurality of frequencies includes, selecting a minimum frequency from the range;
testing the minimum frequency;
incrementing the minimum frequency to select a new frequency;
determining if the new frequency exceeds a maximum frequency; and
testing the new frequency.

9. The method of claim 6, wherein establishing a range of frequencies to be tested comprises:
determining a minimum frequency and a maximum frequency that define the range; and
storing the minimum frequency and the maximum frequency in a computer readable medium.

10. A computer readable storage medium having stored thereon computer readable instruction code for performing a method of determining the level of liquid mass in a storage tank by use of an externally mounted ultrasonic transducer, the method comprising:
transmitting pulses of acoustical energy at an operating frequency into the liquid mass;
timing the arrival of return echoes of the transmitted pulses; and
altering the operating frequency of the transmitted pulses by,
transmitting pulses a plurality of times at the operating frequency into the liquid mass,
determining whether each transmitted pulse results in a miss count or in an echo,
determining a miss count versus echo ratio,
determining if the ratio is acceptable, and
resetting the operating frequency.

11. The computer readable storage medium of claim 10, wherein resetting the operating frequency comprises:
establishing a range of frequencies to be tested,
testing a plurality of frequencies from the range to determine if each frequency generates an echo,
determining the widest subrange of frequencies that each generated an echo, and
setting the operating frequency as substantially the center frequency from the widest subrange.

12. The computer readable storage medium of claim 10, wherein testing the plurality of frequencies includes,
selecting a minimum frequency from the range;
testing the minimum frequency;
incrementing the minimum frequency to select a new frequency;
determining if the new frequency exceeds a maximum frequency; and
testing the new frequency.

13. The computer readable storage medium of claim 10, further comprising:
determining if an event requiring measurement of the level of the liquid mass is required.

14. The computer readable storage medium of claim 10, further comprising:
determining the frequency of the last transmitted pulse; and
setting the operating frequency to the frequency of the last transmitted pulse.

15. The computer readable storage medium of claim 10, wherein the computer readable storage medium comprises a microcontroller.

16. The computer readable storage medium of claim 10, wherein transmitting pulses of acoustical energy at an operating frequency into the liquid mass comprises:
applying a direct current first pulse to a first opposing side of the ultrasonic transducer and simultaneously applying zero voltage to a second opposing side of the ultrasonic transducer; and
applying a direct current second pulse of substantially the same voltage and duration as the direct current first pulse to the second opposing side of the ultrasonic transducer and simultaneously applying zero voltage to the first opposing side to thereby alternatively pulse the opposing sides of the ultrasonic transducer.

17. The computer readable storage medium of claim 16, wherein the direct current first and second pulses are approximately square waves.

18. A computer readable storage medium having stored thereon computer readable instruction code for performing a method of determining the level of liquid in a storage tank by use of an externally mounted ultrasonic transducer, the method comprising:
determining an operating frequency for the ultrasonic transducer by,
establishing a range of frequencies to be tested,
testing a plurality of frequencies from the range to determine if each frequency generates an echo,
determining the widest subrange of frequencies that each generated an echo, and
setting the operating frequency as a frequency within the widest subrange of frequencies;
transmitting pulses of acoustical energy into the liquid mass at the operating frequency; and
timing the arrival of echoes of the transmitted pulses.

19. The computer readable storage medium of claim 18, wherein setting the operating frequency as a frequency within the widest subrange of frequencies includes setting the operating frequency as substantially the center frequency of the widest subrange.

20. The computer readable storage medium of claim 18, wherein testing the plurality of frequencies includes,
selecting a minimum frequency from the range;
testing the minimum frequency;
incrementing the minimum frequency to select a new frequency;
determining if the new frequency exceeds a maximum frequency; and
testing the new frequency.

21. The computer readable storage medium of claim 18, wherein establishing a range of frequencies to be tested comprises:
determining a minimum frequency and a maximum frequency that define the range; and
storing the minimum frequency and the maximum frequency in a computer readable medium.

22. The computer readable storage medium of claim 18, wherein transmitting pulses of acoustical energy at the operating frequency into the liquid mass comprises:
applying a direct current first pulse to a first opposing side of the ultrasonic transducer and simultaneously applying zero voltage to a second opposing side of the ultrasonic transducer; and
applying a direct current second pulse of substantially the same voltage and duration as the direct current first pulse to the second opposing side of the ultrasonic transducer and simultaneously applying zero voltage to the first opposing side to thereby alternatively pulse the opposing sides of the ultrasonic transducer.

* * * * *